E. W. SMITH.
BRAKE.
APPLICATION FILED DEC. 29, 1914.

1,159,113.

Patented Nov. 2, 1915.
2 SHEETS—SHEET 1.

Witnesses

Inventor
E. W. Smith,
By Victor J. Evans
Attorney

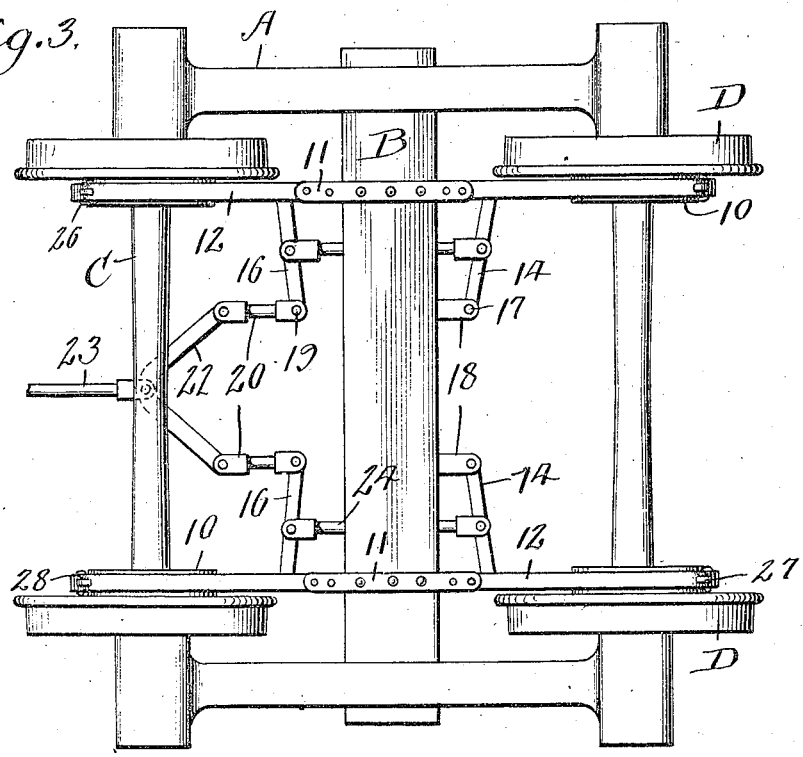
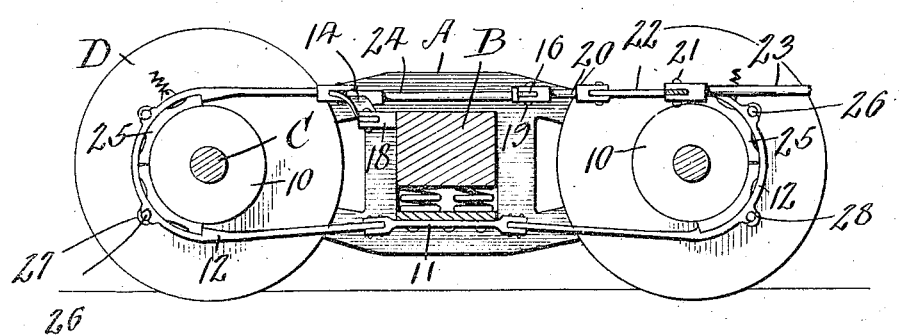

UNITED STATES PATENT OFFICE.

EDGAR W. SMITH, OF WINNEMUCCA, NEVADA, ASSIGNOR OF TWO-SIXTHS TO FITTI MARCELLO, TWO-SIXTHS TO JOSEPH H. KINKADE, AND ONE-SIXTH TO WILLIAM G. TUCKER, ALL OF WINNEMUCCA, NEVADA.

BRAKE.

1,159,113. Specification of Letters Patent. Patented Nov. 2, 1915.

Application filed December 29, 1914. Serial No. 879,522.

*To all whom it may concern:*

Be it known that I, EDGAR W. SMITH, a citizen of the United States, residing at Winnemucca, in the county of Humboldt and State of Nevada, have invented new and useful Improvements in Brakes, of which the following is a specification.

The invention relates to brakes, and more particularly to the class of vehicle or car brakes.

The primary object of the invention is the provision of a brake wherein minimum leverage will be required for the application thereof, and also the employment of the usual brake beams is entirely dispensed with.

Another object of the invention is the provision of a brake of this character wherein the brake shoes are carried by bands which partly encircle the brake wheels, the latter being integrally formed with the wheels of the car or vehicle so that each wheel will be braked, and the said brakes can be quickly and easily applied with the requirement of minimum exertion.

A further object of the invention is the provision of a brake of this character wherein the construction thereof is of novel form, possessing simplicity, durability, reliability and efficiency in its operation, and also one which may be manufactured at a minimum cost.

With these and other objects in view, the invention consists in the construction, combination and arrangement of parts as will be hereinafter fully described, illustrated in the accompanying drawings, and pointed out in the claim hereunto appended.

Figure 1:
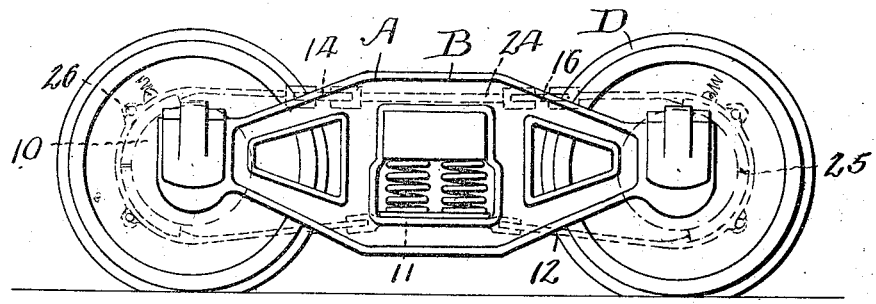
Figure 2:
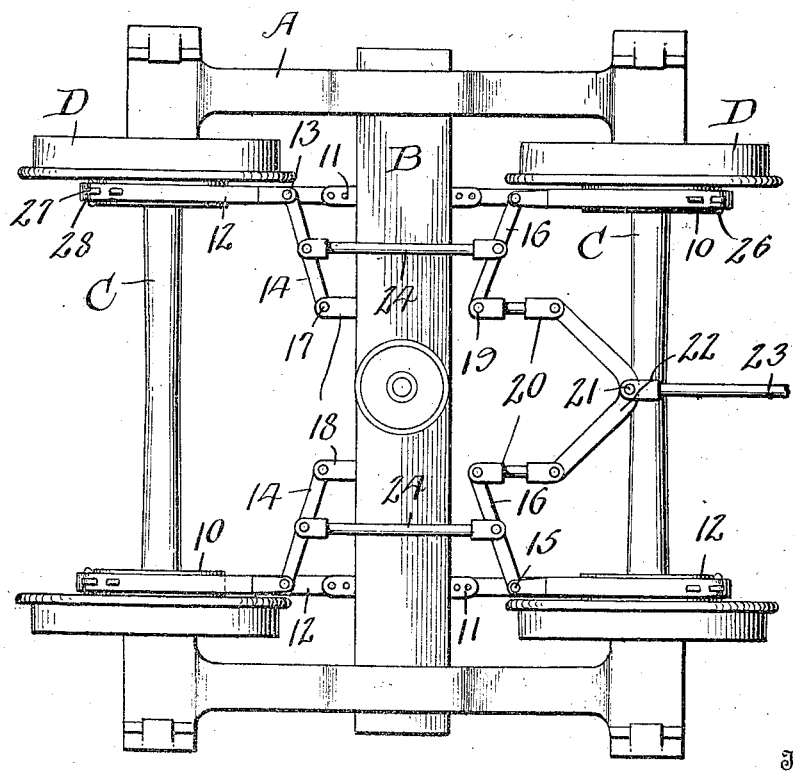

In the drawings: Figure 1 is a side elevation of a car truck, showing the brake constructed in accordance with the invention thereon. Fig. 2 is a top plan view thereof. Fig. 3 is a bottom plan view. Fig. 4 is a vertical longitudinal sectional view through the truck.

Similar reference characters indicate corresponding parts throughout the several views in the drawings.

Referring to the drawings in detail, A designates a truck frame with its bolster B, axles C, and traction wheels D, the same being of the ordinary well-known construction, and has mounted thereon the brake hereinafter fully described.

Integrally formed at the inner side of each traction wheel D is an annular brake flange or drum 10 on which act the brake comprising a pair of brackets 11 which are fixed transversely in spaced relation to each other to the under side of the bolster B, and to which are connected the brake bands 12, the same being trained over the flanges or drums 10, and one pair of these bands are connected by means of pivots 13 with rocking levers 14, while the other pair of bands are connected by means of pivots 15 to a pair of levers 16, the levers 14 being pivoted at 17 in hangers or bearings 18 fixed in the top section of the bolster B, while connected by means of pivots 19 to the levers 16 are links 20, the latter being also pivoted at 21 to a fork 22 which is pivotally connected to an operating rod or cable 23 controlled from any suitable brake standard mounted upon the body of the car at one end thereof.

The pairs of rocking levers 14 and 16 have pivotally connected medially thereof coupling rods 24 so that on the tightening of the rod or cable 23 the levers 14 and 16 will be shifted for the tightening of the bands 11 about the flanges or drums 10 for the braking of the wheels D of the vehicle or car. To release the brake it is only necessary to slacken the rod or cable 23 so that the wheels D will be free.

Mounted on the bands 11 are brake shoes 25 which are adapted to contact with the flanges or drums 10 on the car wheel D when the brake is applied so as to frictionally hold the flanges or drums for the stopping of the car or vehicle. The shoes 25 can be readily detached from the band in event of wear thereof so that new shoes can be placed in their stead. The brake shoes 25 are detachably connected to the bands 11 through the medium of keys or pins 26 which are passed through eyes 27 integrally formed with the shoes, the said eyes being adapted to pass through suitable openings formed in the bands 11, which are provided with seats 28 for the keys or pins 26, as shown.

From the foregoing description, taken in connection with the accompanying drawings, it is thought that the construction and manner of operation of the device will be clearly understood, and therefore a more extended explanation has been omitted.

What is claimed is:—

The combination with a truck having traction wheels formed with brake drums, of cross brackets fixed to the bolster of the truck in spaced parallel relation to each other, hangers fixed to the bolster between the said brackets, levers pivoted to said hangers, brake bands encircling the brake drum and having the ends of their lowermost stretches pivoted to the brackets, adjustable coupling rods pivoted to the levers intermediate the ends thereof, levers pivoted to the coupling rods, pivots connecting the ends of the upper stretches of the brake bands to the said levers, an operating fork, and links pivoted to the last-named levers and the said fork.

In testimony whereof I affix my signature in presence of two witnesses.

EDGAR W. SMITH.

Witnesses:
C. L. TOBIN,
J. SHEEHAN.